United States Patent
Li et al.

(10) Patent No.: US 11,138,027 B2
(45) Date of Patent: Oct. 5, 2021

(54) METHOD AND TERMINAL FOR IMPLEMENTING HOST CARD EMULATION, AND DATA ROUTING METHOD AND APPARATUS

(71) Applicant: HUAWEI TECHNOLOGIES CO., LTD., Guangdong (CN)

(72) Inventors: Guoqing Li, Shenzhen (CN); Xinmiao Chang, Beijing (CN); Jingqing Mei, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 792 days.

(21) Appl. No.: 15/756,711

(22) PCT Filed: Sep. 2, 2015

(86) PCT No.: PCT/CN2015/088889
§ 371 (c)(1),
(2) Date: Mar. 1, 2018

(87) PCT Pub. No.: WO2017/035819
PCT Pub. Date: Mar. 9, 2017

(65) Prior Publication Data
US 2018/0246742 A1  Aug. 30, 2018

(51) Int. Cl.
*G06F 9/455* (2018.01)
*G06F 9/445* (2018.01)
(Continued)

(52) U.S. Cl.
CPC ............ *G06F 9/45508* (2013.01); *G06F 8/61* (2013.01); *G06F 9/445* (2013.01); *G06F 9/455* (2013.01);
(Continued)

(58) Field of Classification Search
CPC ........ G06F 9/45508; G06F 8/61; G06F 9/445; G06F 9/455; G06F 9/54; H04W 88/02; H04B 5/0031
(Continued)

(56) References Cited

U.S. PATENT DOCUMENTS

2009/0247077 A1* 10/2009 Sklovsky ................ G06F 9/445
455/41.1
2013/0331029 A1* 12/2013 Tang ....................... H04W 4/60
455/41.1
(Continued)

FOREIGN PATENT DOCUMENTS

CN       102047223 A    5/2011
CN       103491589 A    1/2014
(Continued)

OTHER PUBLICATIONS

Chinese Office Action issued in Chinese Application No. 201580043877.1 dated Feb. 28, 2019, 30 pages.
(Continued)

*Primary Examiner* — Justin C Mikowski
(74) *Attorney, Agent, or Firm* — Fish & Richardson P.C.

(57) ABSTRACT

A terminal installs, according to a type of an HCE application, the HCE application in a terminal environment corresponding to the type of the HCE application. The terminal parses a first identifier of the HCE application and a second identifier included in the HCE application, where the first identifier identifies the HCE application in the terminal, and the second identifier identifies a message flow between a card reading device and the HCE application. The terminal registers routing information of the HCE application with the TEE, where the routing information includes the first identifier, the second identifier, and the terminal environment in which the HCE application is installed. An HCE
(Continued)

A terminal obtains external data by using an NFCC in a TEE or an NFCC in an REE —— S1041

The NFCC in the TEE or the NFCC in the REE sends the external data that a route target is a device host to the TEE —— S1042 application with two different security levels, a TEE and an REE, is supported on a terminal.

17 Claims, 10 Drawing Sheets

(51) Int. Cl.
    *H04W 88/02*     (2009.01)
    *G06F 9/54*     (2006.01)
    *G06F 8/61*     (2018.01)
    *H04B 5/00*     (2006.01)

(52) U.S. Cl.
    CPC .............. *G06F 9/54* (2013.01); *H04W 88/02* (2013.01); *H04B 5/0031* (2013.01)

(58) Field of Classification Search
    USPC .......................................................... 703/23
    See application file for complete search history.

(56) References Cited

U.S. PATENT DOCUMENTS

| | | | |
|---|---|---|---|
| 2015/0178724 A1* | 6/2015 | Ngo | G06Q 20/322 705/71 |
| 2015/0244718 A1* | 8/2015 | Smets | G06F 21/74 726/7 |
| 2016/0266943 A1* | 9/2016 | Hans | G06F 9/54 |

FOREIGN PATENT DOCUMENTS

| | | |
|---|---|---|
| CN | 103778395 A | 5/2014 |
| CN | 104636666 A | 5/2015 |

OTHER PUBLICATIONS

Zhang Yafei et al.,"Research on TEE-Based Security Scheme for NFC Card Emulation",Journal of Beijing Electronic Science and Technology Institute vol. 22 No. 4,dated Dec. 31, 2014,total 12 pages.

International Search Report issued in International Application No. PCT/CN2015/088889 on 13 pages.

XP055495129 Christian Damour et al.,"The NFC Security Quiz v2.0-Updated with HCE and Tokenisation",FIME, dated Aug. 1, 2015,total 34 pages.

Extended European Search Report issued in European Application No. 15902626.9 dated Aug. 3, 2018, 9 pages.

* cited by examiner

| Router 1 | Second identifier 1 | First identifier 1 | REE |
|---|---|---|---|
| Router 2 | Second identifier 2 | First identifier 2 | TEE |
FIG. 8
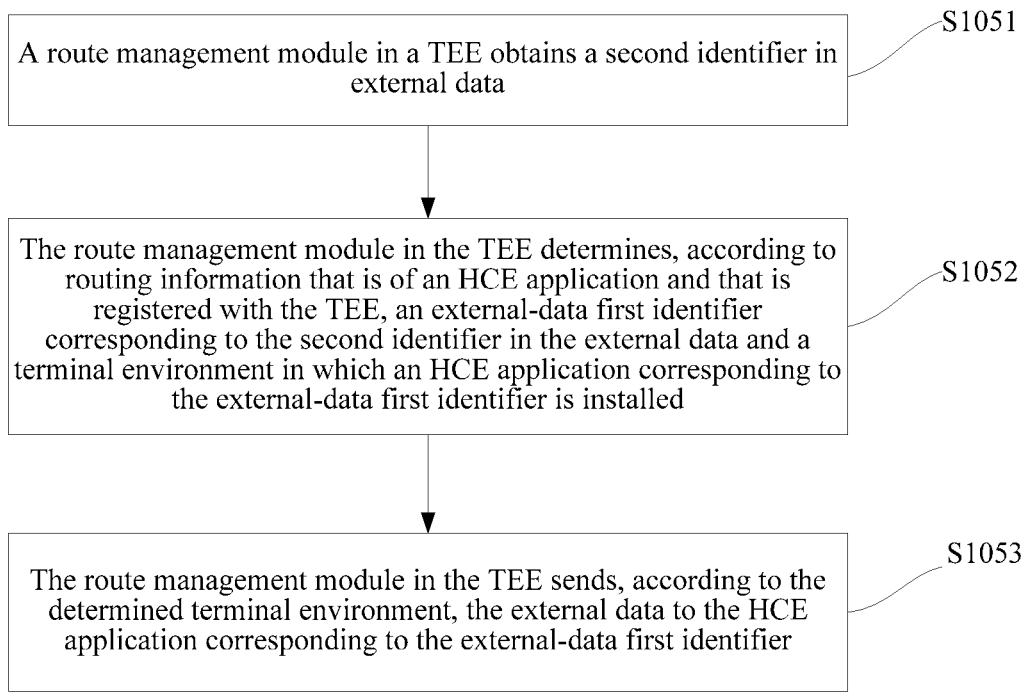
FIG. 9
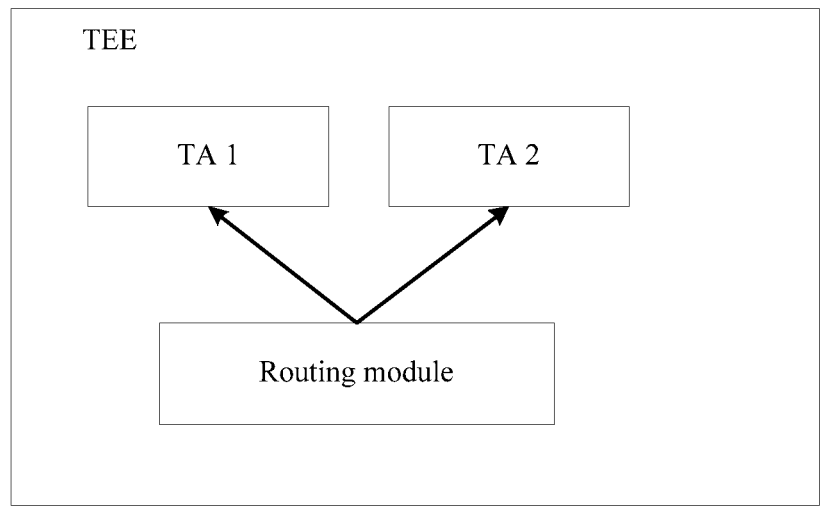
FIG. 10 ns/088889, filed on Sep. 2, 2015, which is hereby incorporated by reference in its entirety.

METHOD AND TERMINAL FOR IMPLEMENTING HOST CARD EMULATION, AND DATA ROUTING METHOD AND APPARATUS

CROSS-REFERENCE TO RELATED APPLICATIONS

This application is a National Stage of International Application No. PCT/CN2015/088889, filed on Sep. 2, 2015, which is hereby incorporated by reference in its entirety.

TECHNICAL FIELD

The present invention relates to the field of communications technologies, and in particular, to a method and a terminal for implementing host card emulation, and a data routing method and apparatus.

BACKGROUND

A card emulation (Card Emulation, CE) function refers to a terminal that uses a function of supporting near field communication (Near Field Communication, NFC) and that includes a secure element (Secure Element, SE) and emulates a contactless chip card (Contactless IC Card). A card emulation application is installed into the secure element of the terminal and is running in the secure element. The secure element generally allows installation of multiple card emulation applications. In this way, carrying, by a user, one terminal is equivalent to carrying multiple entity cards. This brings great convenience to the user.

Host card emulation (Host-based Card Emulation or Host Card Emulation, HCE) refers to that a card emulation application does not need to be installed in a secure element, but, like a common application, is directly installed in an operating system of a terminal and is running on a terminal host (Device Host, or referred to as a device host). HCE is widely applied to near field communication (Near Field Communication, NFC).

Currently, an HCE application is generally running in a rich execution environment (Rich Execution Environment, REE) of a terminal and communicates with a card reading device such as a POS machine or a card reader by using an NFC interface of the terminal. The REE is a running environment with a relatively low security level. That is, an application of any source can be installed in the REE of the terminal after being permitted by a user. In addition, protection for data stored in the REE cannot resist threats from malicious software. Therefore, when an HCE application is installed and running in the REE, confidential data such as a related user account is prone to be stolen due to a relatively low security level.

However, currently an HCE mechanism often needs to be used to implement some applications with relatively high security performance requirements, such as an HCE payment application released by a bank. If these HCE applications with relatively high security performance requirements are installed in an REE, account data associated with the HCE applications is prone to be stolen by malicious programs. Therefore, data associated with HCE programs in the REE is in a relatively dangerous state.

SUMMARY

Embodiments of the present invention provide a method and a terminal for implementing host card emulation, and a data routing method and apparatus, so as to implement HCE functions of different security levels on a terminal.

According to a first aspect, a method for implementing host card emulation HCE is provided, including:

installing, by a terminal according to a type of an HCE application, the HCE application in a terminal environment corresponding to the type of the HCE application, where the terminal environment includes a trusted execution environment TEE and a rich execution environment REE;

parsing, by the terminal, a first identifier of the HCE application and at least one second identifier included in the HCE application, where the first identifier is used to uniquely identify the HCE application in the terminal, and the second identifier is used to identify a message flow between a card reading device and the HCE application; and registering, by the terminal, routing information of the HCE application with the TEE, where the routing information includes the first identifier, the at least one second identifier, and the terminal environment in which the HCE application is installed.

With reference to the first aspect, in a first implementation manner, the method further includes:

sending, by the terminal, obtained external data to a route management module in the TEE; and sending, by the route management module, the external data to an HCE application corresponding to the external data.

With reference to the first implementation manner of the first aspect, in a second implementation manner, the sending, by the terminal, obtained external data to a route management module in the TEE specifically includes:

obtaining, by the terminal, external data by using a near field communication controller NFCC in the TEE or an NFCC in the REE; and sending, by the NFCC in the TEE or the NFCC in the REE, the external data that a route target is a device host to the route management module in the TEE.

With reference to the first implementation manner of the first aspect or the second implementation manner of the first aspect, in a third implementation manner, the sending, by the route management module, the external data to an HCE application corresponding to the external data specifically includes:

obtaining, by the route management module, a second identifier in the external data;

determining, by the route management module, according to the routing information registered with the TEE, an external-data first identifier corresponding to the second identifier in the external data and a terminal environment in which an HCE application corresponding to the external-data first identifier is installed; and sending, by the route management module according to the determined terminal environment, the external data to the HCE application corresponding to the external-data first identifier.

With reference to the third implementation manner of the first aspect, in a fourth implementation manner, the sending, according to the determined terminal environment, the external data to the HCE application corresponding to the external-data first identifier includes:

if the determined terminal environment is the TEE, sending the external data to an HCE application corresponding to the external-data first identifier in the TEE by using an established session; and if the determined terminal environment is the REE, sending the external data to an HCE application corresponding to the external-data first identifier in the REE by using a service program or a shared memory in the TEE.

According to a second aspect, a data routing method is provided, including:

sending, by a terminal, obtained external data to a route management module in a TEE; and sending, by the route management module, the external data to an HCE application corresponding to the external data.

With reference to the second aspect, in a first implementation manner, the sending, by a terminal, obtained external data to a route management module in a TEE specifically includes:

obtaining, by the terminal, the external data by using an NFCC driver in the TEE or an NFCC driver in an REE, and sending the external data that a route target is a device host to the route management module in the TEE.

With reference to the second aspect or the first implementation manner of the second aspect, in a second implementation manner, the sending, by the route management module, the external data to an HCE application corresponding to the external data includes:

obtaining, by the route management module, a second identifier in the external data, where the second identifier is used to identify a message flow between a card reading device and an HCE application;

determining, according to routing information that is of the HCE application and that is registered with the TEE, an external-data first identifier corresponding to the second identifier in the external data and a terminal environment in which an HCE application corresponding to the external-data first identifier is installed, where the first identifier is used to uniquely identify an HCE application in the terminal; and sending, according to the determined terminal environment, the external data to the HCE application corresponding to the external-data first identifier.

With reference to the second implementation manner of the second aspect, in a third implementation manner, the sending, according to the determined terminal environment, the external data to the HCE application corresponding to the external-data first identifier includes:

if the determined terminal environment is the TEE, sending the external data to the HCE application corresponding to the external-data first identifier in the TEE by using an established session; and if the determined terminal environment is the REE, sending the external data to the HCE application corresponding to the external-data first identifier in the REE by using a service program or a shared memory in the TEE.

According to a third aspect, a terminal for implementing host card emulation HCE is provided, including:

an installation unit, configured to install, according to a type of an HCE application, the HCE application in a terminal environment corresponding to the type of the HCE application, where the terminal environment includes a trusted execution environment TEE and a rich execution environment REE;

a parsing unit, configured to parse a first identifier of the HCE application installed by the installation unit and at least one second identifier included in the HCE application, where the first identifier is used to uniquely identify the HCE application in the terminal, and the second identifier is used to identify a message flow between a card reading device and the HCE application; and a registration unit, configured to register routing information of the HCE application with the TEE, where the routing information includes the first identifier and the at least one second identifier that are parsed by the parsing unit, and the terminal environment in which the HCE application is installed.

With reference to the third aspect, in a first implementation manner, the terminal further includes a first routing unit and a second routing unit, where the first routing unit is configured to send obtained external data to the second routing unit in the TEE; and the second routing unit is configured to send the external data to an HCE application that corresponds to the external data and that is installed by the installation unit.

With reference to the first implementation manner of the third aspect, in a second implementation manner, the first routing unit is specifically configured to send the obtained external data to the second routing unit in the TEE in the following manner:

obtaining external data by using a near field communication controller NFCC in the TEE or an NFCC in the REE; and sending, by the NFCC in the TEE or the NFCC in the REE, the external data that a route target is a device host to the second routing unit in the TEE.

With reference to the first implementation manner of the third aspect or the second implementation manner of the third aspect, in a third implementation manner, the second routing unit is specifically configured to send the external data to the HCE application corresponding to the external data in the following manner:

obtaining a second identifier in the external data;

determining, according to the information registered with the TEE, an external-data first identifier corresponding to the second identifier in the external data and a terminal environment in which an HCE application corresponding to the external-data first identifier is installed; and sending, according to the determined terminal environment, the external data to the HCE application corresponding to the external-data first identifier.

With reference to the third implementation manner of the third aspect, in a fourth implementation manner, the second routing unit is specifically configured to send, according to the determined terminal environment, the external data to the HCE application corresponding to the external-data first identifier in the following manner:

if the determined terminal environment is the TEE, sending the external data to an HCE application corresponding to the external-data first identifier in the TEE by using an established session; and if the determined terminal environment is the REE, sending the external data to an HCE application corresponding to the external-data first identifier in the REE by using a service program or a shared memory in the TEE.

According to a fourth aspect, a data routing apparatus is provided, including:

an obtaining unit, configured to obtain external data;

a first routing unit, configured to send the external data obtained by the obtaining unit to a second routing unit in a TEE; and the second routing unit, configured to send the external data to an HCE application corresponding to the external data.

With reference to the fourth aspect, in a first implementation manner, the first routing unit is specifically configured to send the obtained external data to the second routing unit in the TEE in the following manner:

obtaining the external data by using an NFCC driver in the TEE or an NFCC driver in an REE, and sending the external data that a route target is a device host to the second routing unit in the TEE.

With reference to the first implementation manner of the fourth aspect, in a second implementation manner, the second routing unit is specifically configured to send the external data to the HCE application corresponding to the external data in the following manner:

obtaining a second identifier in the external data, where the second identifier is used to identify a message flow between a card reading device and an HCE application;

determining, according to routing information that is of the HCE application and that is registered with the TEE, an external-data first identifier corresponding to the second identifier in the external data and a terminal environment in which an HCE application corresponding to the external-data first identifier is installed, where the first identifier is used to uniquely identify an HCE application in the terminal; and sending, according to the determined terminal environment, the external data to the HCE application corresponding to the external-data first identifier.

With reference to the second implementation manner of the fourth aspect, in a third implementation manner, the second routing unit is specifically configured to send, according to the determined terminal environment, the external data to the HCE application corresponding to the first identifier in the following manner:

if the determined terminal environment is the TEE, sending the external data to an HCE application corresponding to the external-data first identifier in the TEE by using an established session; and if the determined terminal environment is the REE, sending the external data to an HCE application corresponding to the external-data first identifier in the REE by using a service program or a shared memory in the TEE.

According to a fifth aspect, a terminal for implementing host card emulation HCE is provided, including: a storage, a peripheral, a communications unit, and a processor, where the storage includes a public random-access memory RAM and a public read-only memory ROM that are running in a rich execution environment REE, and a trusted RAM and a trusted ROM that are running in a trusted execution environment TEE, and is configured to store instructions and data;

the peripheral includes a public peripheral in the REE and a trusted peripheral in the TEE;

the communications unit is located in the REE; and the processor is configured to: call instructions and data stored in the public RAM, the public ROM, the trusted RAM, and trusted ROM, and implement the following functions by using the trusted peripheral, the public peripheral, and the communications unit:

installing, according to a type of an HCE application, the HCE application in a terminal environment corresponding to the type of the HCE application, where the terminal environment includes the TEE and the REE; parsing a first identifier of the HCE application and at least one second identifier included in the HCE application, where the first identifier is used to uniquely identify the HCE application in the terminal, and the second identifier is used to identify a message flow between a card reading device and the HCE application; and registering routing information of the HCE application with the TEE, where the routing information includes the first identifier, the at least one second identifier, and the terminal environment in which the HCE application is installed.

With reference to the fifth aspect, in a first implementation manner, the processor is further configured to:

send obtained external data to a route management module in the TEE; and control the route management module to send the external data to an HCE application corresponding to the external data.

With reference to the first implementation manner of the fifth aspect, in a second implementation manner, the processor is specifically configured to send the obtained external data to the route management module in the TEE in the following manner:

obtaining external data by using a near field communication controller NFCC in the TEE or an NFCC in the REE; and sending, by the NFCC in the TEE or the NFCC in the REE, the external data that a route target is a device host to the route management module in the TEE.

With reference to the first implementation manner or the second implementation manner of the fifth aspect, in a third implementation manner, the processor is specifically configured to control the route management module to send the external data to the HCE application corresponding to the external data in the following manner:

controlling the route management module to obtain a second identifier in the external data by using the communications unit and the peripheral; determining, according to the routing information registered with the TEE, an external-data first identifier corresponding to the second identifier in the external data and a terminal environment in which an HCE application corresponding to the external-data first identifier is installed; and controlling the route management module to send, according to the determined terminal environment, the external data to the HCE application corresponding to the external-data first identifier.

With reference to the third implementation manner of the fifth aspect, in a fourth implementation manner, the processor is specifically configured to control the route management module to send, according to the determined terminal environment, the external data to the HCE application corresponding to the external-data first identifier in the following manner:

if the determined terminal environment is the TEE, sending the external data to an HCE application corresponding to the external-data first identifier in the TEE by using an established session; and if the determined terminal environment is the REE, sending the external data to an HCE application corresponding to the external-data first identifier in the REE by using a service program or a shared memory in the TEE.

According to the method and terminal for implementing host card emulation, and the data routing method and apparatus provided in the embodiments of the present invention, an HCE application is distinguished as a TA or a CA by using different application type labels, so as to install the TA in a TEE and install the CA in an REE, implementing HCE applications based on two different security levels, that is, the TEE and the REE.

BRIEF DESCRIPTION OF DRAWINGS

FIG. 8 is a schematic diagram of a routing table that is set according an embodiment of the present invention;

FIG. 9 is a schematic diagram of a process of executing routing in a TEE according to an embodiment of the present invention;

FIG. 10 is a schematic diagram of a process of forwarding external data to a TA according to an embodiment of the present invention;

DESCRIPTION OF EMBODIMENTS

Figure 1A:
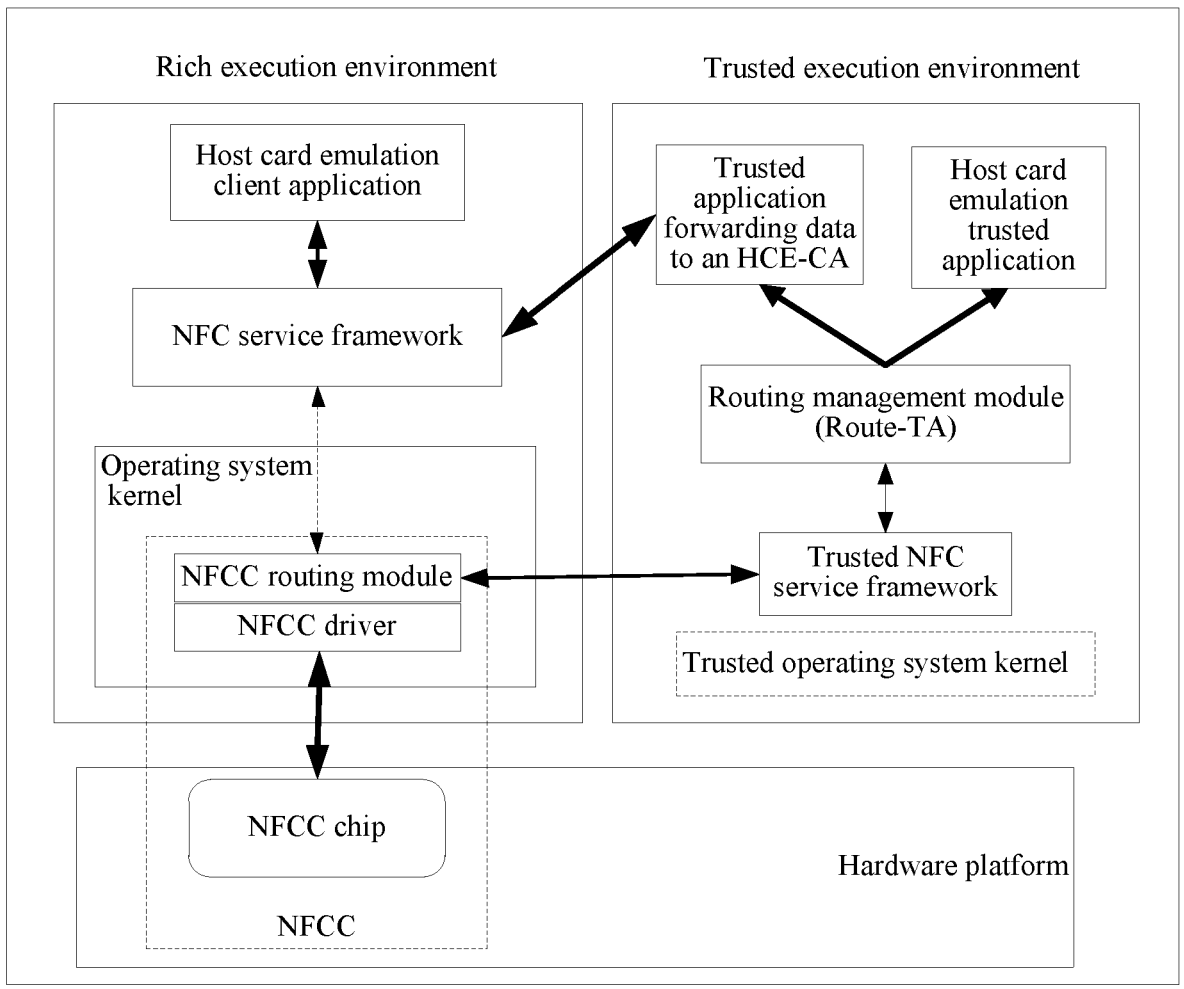
FIG. 1A to FIG. 1B are system architectures of a terminal to which a host card emulation method according to an embodiment of the present invention is applied.

The following clearly describes the technical solutions in the embodiments of the present invention with reference to the accompanying drawings in the embodiments of the present invention.

A trusted execution environment (Trusted Execution Environment, TEE) and an REE are two program running environments coexisting in a terminal. The TEE and the REE may be referred to as terminal environments and each include hardware resources such as a storage and a processor, and software such an operating system (Operating System, OS) and a framework (Framework). The REE does not strictly define sources of applications. If permitted by a user, the REE can accept installation of software of any source. However, the TEE is different. Storage in the TEE is secure storage and is managed by a TEE publisher (such as, a terminal manufacturer or operator) and a particular condition for restricting access. When receiving a request for accessing TEE storage, for example, read and write security storage (installation of a program in the TEE is a write security storage operation), a terminal needs to verify whether the request meets a secure access rule. On a premise that the secure access rule is met, corresponding storage content can be accessed. Because of the foregoing characteristic of the TEE, a malicious program cannot access a program installed in the TEE and data of the program. Programs installed in a TEE environment cannot mutually cross a boundary to access data of others. Therefore, a relatively high security level is implemented.

A trusted application (Trusted APPlication, TA) refers to an application running in the TEE and can provide security related functions, such as a password service, a signature service, and an abstract service, to a client application in the REE or other trusted applications in the TEE environment. Correspondingly, a client application (Client APPlication, CA) is an application that is running in the REE and that can communicate with a trusted application TA in the TEE by using a TEE client application programming interface or a shared memory mechanism and call a service provided by the TA.

To help a soft processor (Soft Processor, SP) to select HCE with different security levels according to a service requirement of the SP, an embodiment of the present invention provides a method for implementing host card emulation, so as to implement installation of HCE applications with different security levels on a terminal including a TEE and satisfy different security level requirements of different service requirements. For example, a service requirement with a high security level, such as an application of a financial card or a payment card with relatively high security performance requirements, can be implemented as a TA and be installed in a TEE. A service requirement with a low security level, such as a supermarket membership card or an entrance guard card, can be implemented as a CA and be installed in an REE.

In the method for implementing host card emulation provided in this embodiment of the present invention, whether a terminal environment to be installed is a TEE or an REE is required according to a service requirement of an HCE application, and the HCE application is installed in a corresponding terminal environment.

In this embodiment of the present invention, an application type label used to identify an HCE application installation terminal environment may be defined in a resource file of an HCE application. Whether a terminal environment in which an HCE application should be installed is a TEE or an REE is distinguished by using different application type labels, and the HCE application is installed in the TEE or the REE, so as to support an HCE application with two different security levels, the TEE and the REE, on a terminal.

Figure 1B:
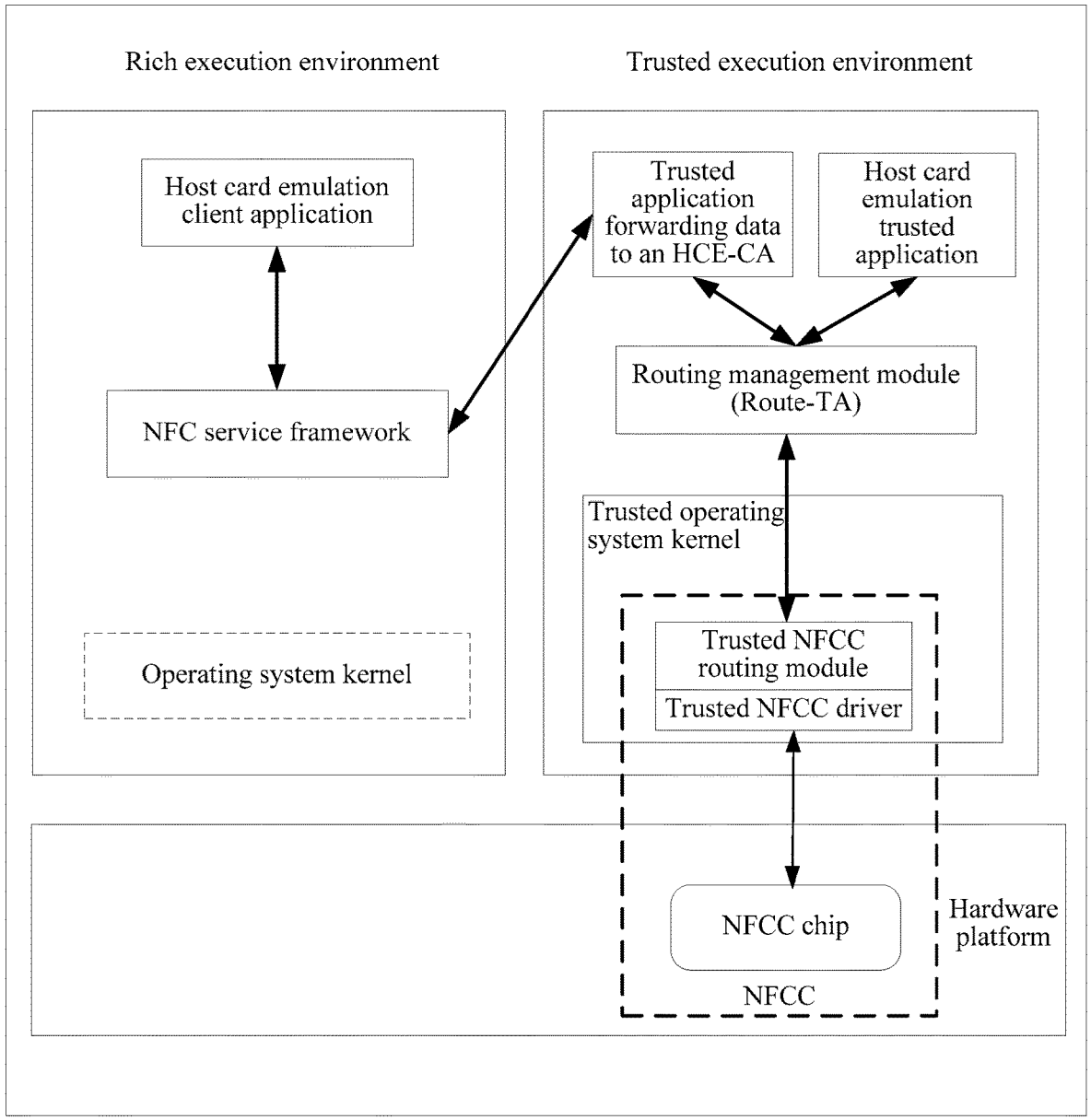

In this embodiment of the present invention, to support an HCE application with two different security levels, the TEE and the REE, on a terminal, that is, install an HCE application with a high security level in the TEE and install an HCE application with a relatively low security level in the REE, a terminal system architecture shown in FIG. 1A or FIG. 1B may be applied, to implement a routing function of HCE applications with different security levels in the TEE. In FIG. 1A, after receiving data, an NFC controller (NFC controller, NFCC) sends the data to an upper-layer application by using an NFCC driver (NFCC driver) and an NFCC routing module in an REE operating system kernel. When supporting an HCE application with two different security levels, a TEE and a REE, the NFCC driver sends the received data to a trusted NFC service framework (NFC Service Framework) in the TEE environment, and the NFC Service Framework in the TEE environment forwards the data to a route management module (Route management Module, also marked as Route-TA in the present invention). The route management module (Route-TA) in the TEE distributes (that is, routes) the data to a TA in the TEE or a CA in the REE. In FIG. 1B, after receiving data, an NFC controller sends the data to a route management module in a TEE by using a trusted NFCC driver in a trusted operating system kernel in the TEE, and the route management module in the TEE distributes the data to a TA in the TEE or a CA in the REE.

It should be noted that in this embodiment of the present invention, the NFCC may also be referred to as a near field communication controller (Near Field Communication Controller, NFCC). The NFCC is a logical entity defined by an NFC forum (NFC Forum), and in the industry, an NFCC is often used to indicate an NFCC chip that implements main NFC functions. In the present invention, the NFCC chip, the NFCC driver, and the NFCC routing module are distinguished. The foregoing three types of hardware or software are all a part of an NFCC logical entity.

Figure 2:
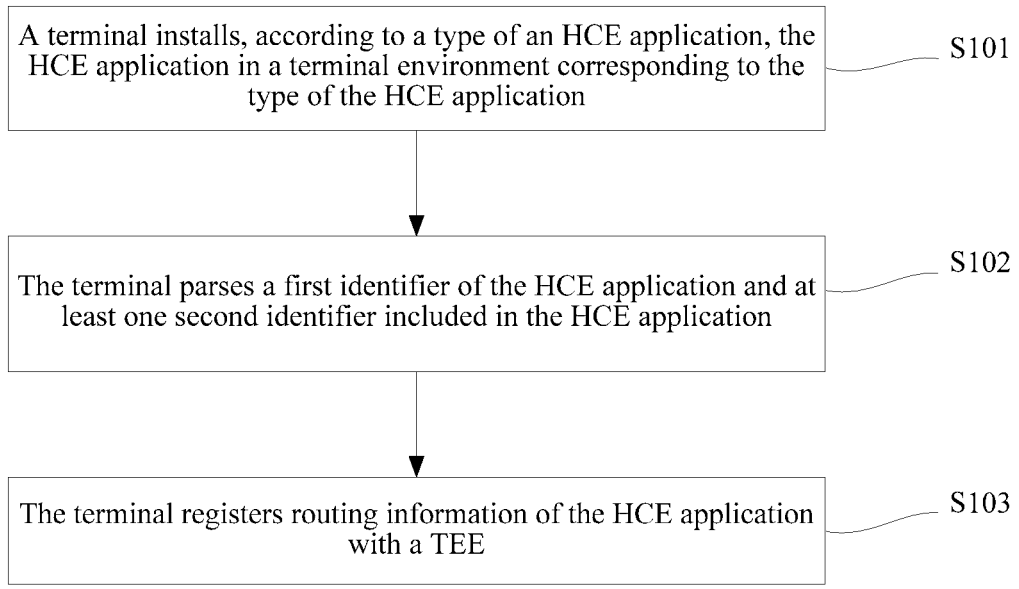
FIG. 2 is a flowchart of implementation of a method for implementing host card emulation according to an embodiment of the present invention.

FIG. 2 is a flowchart of a method for implementing host card emulation according to an embodiment of the present invention. As shown in FIG. 2, the method includes the following steps.

S101: A terminal installs, according to a type of an HCE application, the HCE application in a terminal environment corresponding to the type of the HCE application.

In this embodiment of the present invention, the terminal environment in which the HCE application is installed includes a TEE and an REE. One HCE application only corresponds to one terminal environment, that is, the terminal environment in which the HCE application is running is the TEE or the REE. It should be noted that in this embodiment of the present invention, the terminal environment in which the HCE application is installed is referred to as an environment or an installation environment, and may be certainly referred to as an application running environment or the like. This is not limited in this embodiment of the present invention.

Figure 3:
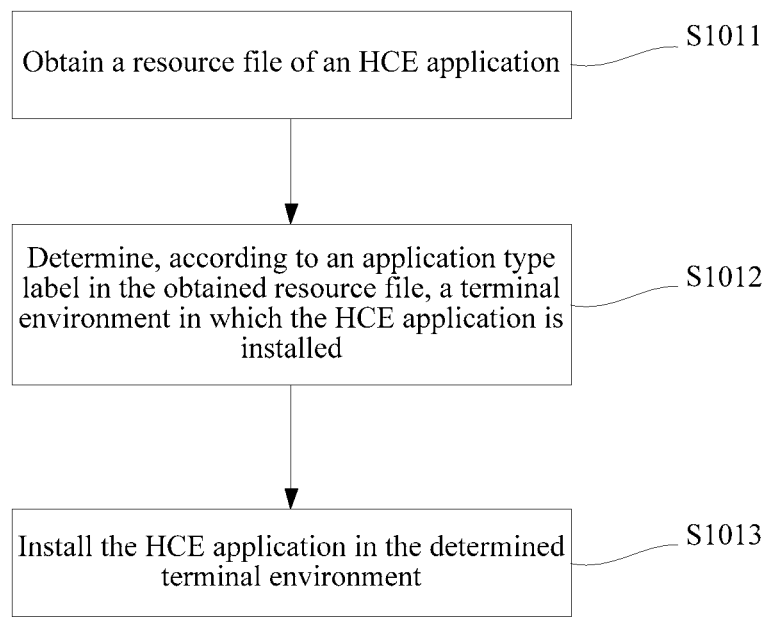
FIG. 3 is a flowchart of implementation of installing an HCE application in a corresponding environment according to an embodiment of the present invention.

Specifically, in this embodiment of the present invention, the terminal may install, according to the type of the HCE application, the HCE application in the terminal environment corresponding to the type of the HCE application by using a method procedure shown in FIG. 3. The method procedure includes the following steps.

S1011: Obtain a resource file of the HCE application.

An HCE application installation package includes a configuration file of the HCE application. The terminal receives the HCE application installation package, checks the configuration file in the installation package, and obtains the resource file of the HCE application according to a resource file name and a path that are specified in the configuration file.

S1012: Determine, according to an application type label in the obtained resource file, the terminal environment in which the HCE application is installed.

In this embodiment of the present invention, whether the terminal environment in which the HCE application is installed is the TEE or the REE is distinguished by using different application type labels. In this embodiment of the present invention, that the HCE application is a CA application may be identified by using an REE host card emulation program (<host-apdu-service/>) label in the resource file, and an environment in which the HCE application is to be installed is the REE. That the HCE application is a TA may be identified by using a TEE host card emulation program (<TEE-apdu-service/>) label in the resource file, and an environment in which the HCE application is to be installed is a TEE. Therefore, if the application type label in the obtained resource file is <host-apdu-service/>, it is determined that a terminal environment in which the HCE application is to be installed is the REE, that is, the application is a CA. If the application type label in the obtained resource file is <TEE-apdu-service/>, it is determined that a terminal environment in which the HCE application is to be installed is the TEE, that is, the application is a TA.

S1013: Install the HCE application in the determined terminal environment.

In this embodiment of the present invention, the terminal environment in which the HCE application is installed is the REE or the TEE. If it is determined that the terminal environment in which the HCE application is installed is the TEE, that is, the application is a TA, the TA is installed in the TEE. If it is determined that the terminal environment in which the HCE application is installed is the REE, that is, the application is a CA, the CA is installed in the REE.

S102: The terminal parses a first identifier of the HCE application and at least one second identifier included in the HCE application.

Each HCE application corresponds to an application identifier (APP ID). Generally, a CA may use an application certificate as an application identifier, and a TA may use a universally unique identifier (Universally Unique Identifier, UUID) as an application identifier. Each HCE application can process multiple message flows between a card reading device and the HCE. The message flows start by sending, by the card reading device, a SELECT AID command. After receiving the SELECT AID by a route management module to the HCE application, the HCE application responds with an APDU command. Then, the card reading device sends another data exchange command, and the HCE application needs to respond. When the terminal receives a SELECT AID command again (generally, an AID in the SELECT AID command is different from an AID in the previous SELECT AID command), a current message flow ends, and anew message flow starts. Which HCE application processes the message flow is specifically determined by the route management module according to the AID in the new SELECT AID command. In a single card swiping transaction performed by using a terminal, the terminal may also only receive one SELECT AID command, and an AID in the command is determined by a payment card that is selected by the user to participate in the transaction. In this case, interaction between a card reading device and the terminal may also be regarded as a message flow from a moment at which the SELECT AID command is received to a moment at which the transaction ends. In conclusion, a message flow is identified by a card application identifier (APPlication IDentifier, AID), and the AID is an identifier that is defined in the ISO/IEC 7816-5 and that is used to identity a card application (APPlet) installed in a smart card. The identifier may also be used to identify a message flow that can be processed by an HCE application or a card application included in an HCE application. One HCE application can implement processing logic of one or more AIDs, and processing logic of each AID corresponds to one card application or corresponds to one message flow between a card reading device and the HCE application. In this embodiment of the present invention, for ease of description, an application identifier identifying the HCE application is referred to as a first identifier, and the first identifier is used to uniquely identify an HCE application. The AID is referred to as a second identifier, and the second identifier is used to identify a message flow between a card reading device and the HCE application.

In this embodiment of the present invention, the first identifier is used to uniquely identify the HCE application in the terminal, and the second identifier is used to identify a message flow between a card reading device and the HCE application.

S103: The terminal registers routing information of the HCE application with a TEE.

In this embodiment of the present invention, the routing information that is of the HCE application and that is registered by the terminal with the TEE includes the first identifier, the at least one second identifier, and the terminal environment in which the HCE application is installed.

In this embodiment of the present invention, installing a TA in the TEE and installing a CA in the REE both require parsing the first identifier and the at least one second identifier included in the HCE application and registering with the TEE the first identifier and the at least one second identifier that are obtained by parsing, and the terminal environment in which the HCE application is installed.

In this embodiment of the present invention, registering the first identifier, the second identifier, and the terminal environment in which the HCE application is installed in the TEE is a necessary step of completing installation and deployment of the HCE. Certainly, an installation and deployment process further includes other necessary steps. This is not limited herein in this embodiment of the present invention.

It should be noted that registration involved in this embodiment of the present invention refers to sending the first identifier of the HCE application, the at least one second identifier related to the HCE application, the terminal environment at which the HCE application is located to a route management module in the TEE. After the route management module performs conflict detection and conflict solving processing on received information, that is, the second identifier related to the HCE application (a situation in which multiple HCE applications process a same second identifier may exist; the route management module needs to perform special processing, such as, specify one of the multiple HCE applications to process a particular second identifier), the route management module generates multiple routing entries according to a correspondence among the first identifier, the second identifier, and the terminal environment in which the HCE application is installed, saves the routing entries to a routing table of the route management module in the TEE, and performs routing according to the routing table when external data is received subsequently. The routing information in this embodiment of the present invention includes the first identifier, the at least one second identifier, and the terminal environment in which the HCE application is installed. Because one HCE application corresponds to one or more second identifiers, and each second identifier can generate one routing entry, routing information of one HCE application includes at least one routing entry.

In this embodiment of the present invention, whether an installation environment of an HCE application is a TEE or an REE may be distinguished by a terminal by using two different application type labels in a resource file. Therefore, when receiving an HCE application installation package, the terminal may determine, by using the application type labels in the resource file, a terminal environment in which the HCE application is installed, and distinguish that the HCE application is a TA or a CA, so as to install the TA in the TEE and install the CA in the REE, so that an HCE application based on two different security levels, the TEE and the REE is implemented.

Further, in this embodiment of the present invention, after routing information of HCE applications installed in the TEE and the REE of the terminal is registered with the TEE, the method may further include the following steps:

S104: The terminal sends obtained external data to a route management module in the TEE.

S105: The route management module sends the external data to an HCE application corresponding to the external data.

Figure 4:
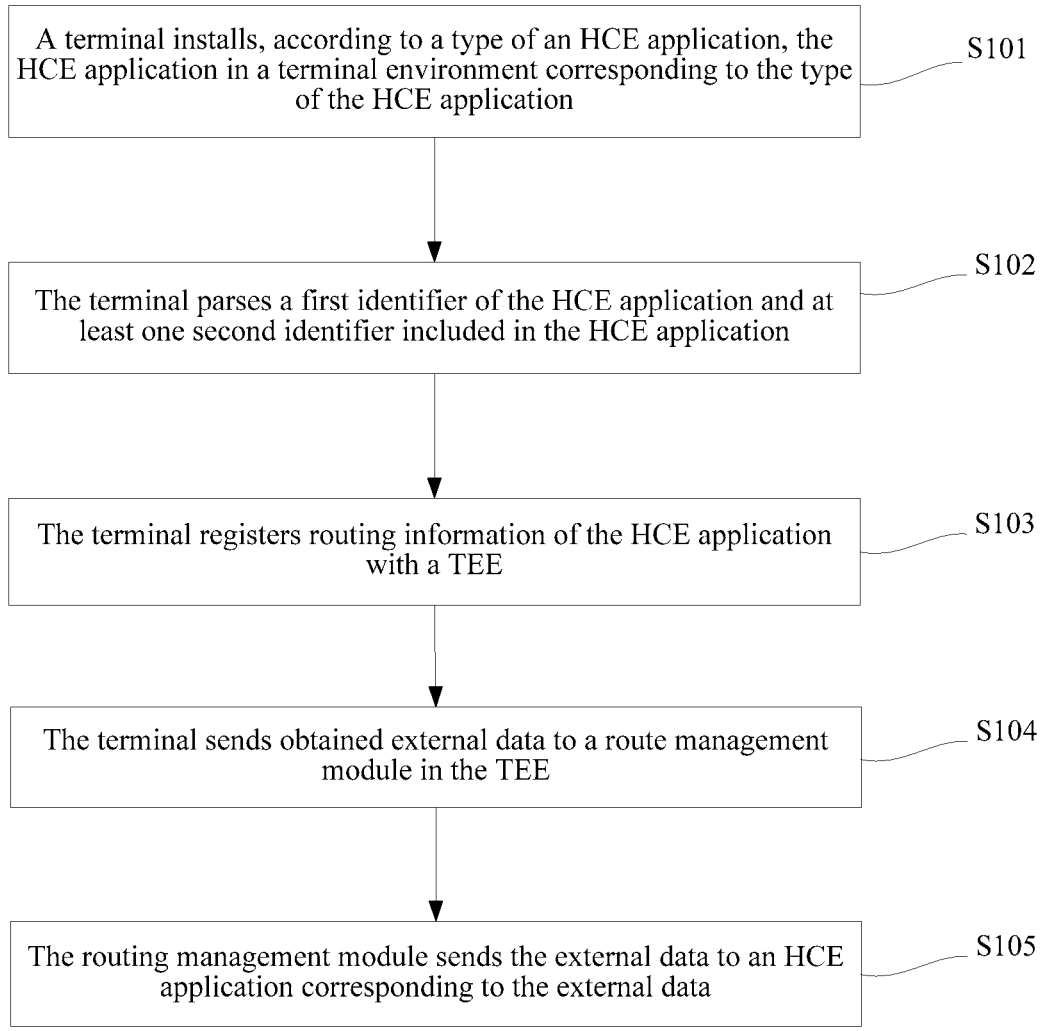
FIG. 4 is a flowchart of implementation of another method for implementing host card emulation according to an embodiment of the present invention.

Refer to FIG. 4 for an implementation flowchart including the foregoing steps S104 and S105 in this embodiment of the present invention.

Figure 5:
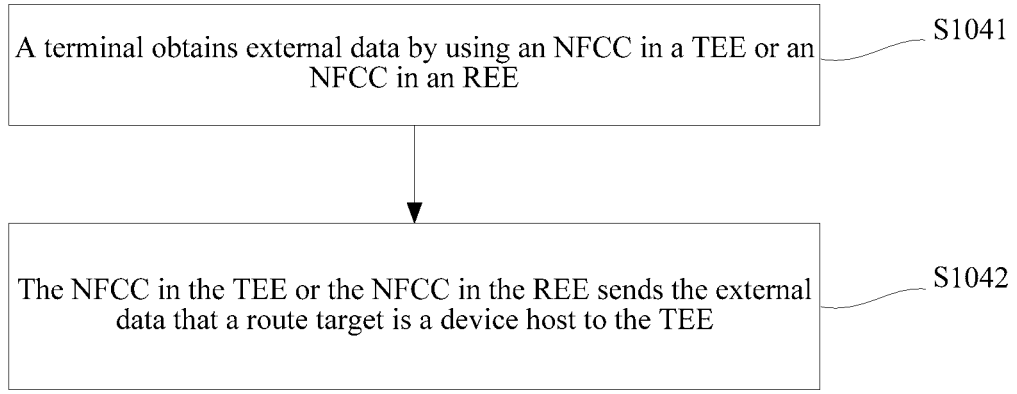
FIG. 5 is a flowchart of sending obtained external data to a route management module in a TEE according to an embodiment of the present invention.

In this embodiment of the present invention, the obtained external data may be sent to the route management module in the TEE by using a data routing method shown in FIG. 5. As shown in FIG. 5, the data routing method includes:

S1041: The terminal obtains the external data by using an NFCC in the TEE or an NFCC in an REE.

When the terminal is in a card emulation working mode, the terminal communicates with a contactless card reading device, such as a contactless POS machine or a contactless card reader, by using an NFC interface, such as an NFC antenna. The terminal obtains the external data from an NFC antenna by using an NFCC chip and an NFCC driver.

Optionally, in this embodiment of the present invention, a trusted NFCC driver may be loaded in the TEE of the terminal, and a trusted operating system (Trusted OS) in the TEE environment obtains access control rights of an NFC interface, so as to obtain the external data.

S1042: The NFCC in the TEE or the NFCC in the REE sends the external data that a route target is a device host to the TEE.

In this embodiment of the present invention, after obtaining external data sent by an external device such as a contactless card reader or a contactless POS machine from an NFC antenna by using an NFCC chip and an NFCC driver, the terminal sends the obtained data to an NFCC routing module for processing. The NFCC routing module is a software entity (for example, a routing module may be implemented as chip firmware). The NFCC routing module obtains a second identifier in the external data and forwards, to the TEE according to a routing table saved in the NFCC, data that needs to be sent to the TEE. In this embodiment of the present invention, the data that needs to be sent to the TEE includes data that a route target is a device host. The device host (Device Host) generally refers to a central processing unit CPU in the terminal and is also referred to as a host central processing unit (Host Central Processing Unit, Host CPU).

The NFC has three working modes, card emulation, P2P, and a card reader. To support the three working modes, the NFCC chip works in a poll mode (a Poll mode, corresponding to P2P and a card reader) and a listen (listen) mode. Card emulation is a listen mode. Therefore, whether routing needs to be executed may be determined by determining whether a current working mode of the NFCC chip is card emulation. Further, whether the obtained external data needs to be sent to the TEE may be determined by using a SELECT AID command in the obtained external data and the routing table configured in the NFCC.

In this embodiment of the present invention, the NFCC in the TEE executes routing for a first time, so as to send the external data that a route target is a device host CPU to the route management module in the TEE. Refer to FIG. 1B. The NFCC in the REE executes routing for a first time, so as to send the external data that a route target is a device host to the route management module in the TEE. Refer to FIG. 1A.

Routing for a first time refers to a process of sending the obtained data to the route management module in the TEE.

In this embodiment of the present invention, to send the external data in the TEE to the HCE application corresponding to the external data, the routing information may be pre-saved. That is, the first identifier and the at least one second identifier of the HCE application and a correspondence thereof are registered. In this embodiment of the present invention, the first identifier and the at least one second identifier of the HCE application may be registered with the route management module in the TEE. Then, the route management module in the TEE routes the data to an HCE application in a corresponding environment based on the saved routing information. In this way, HCE applications of different types can be processed in different terminal environments, so that security based on different HCE applications is improved.

Figure 6:
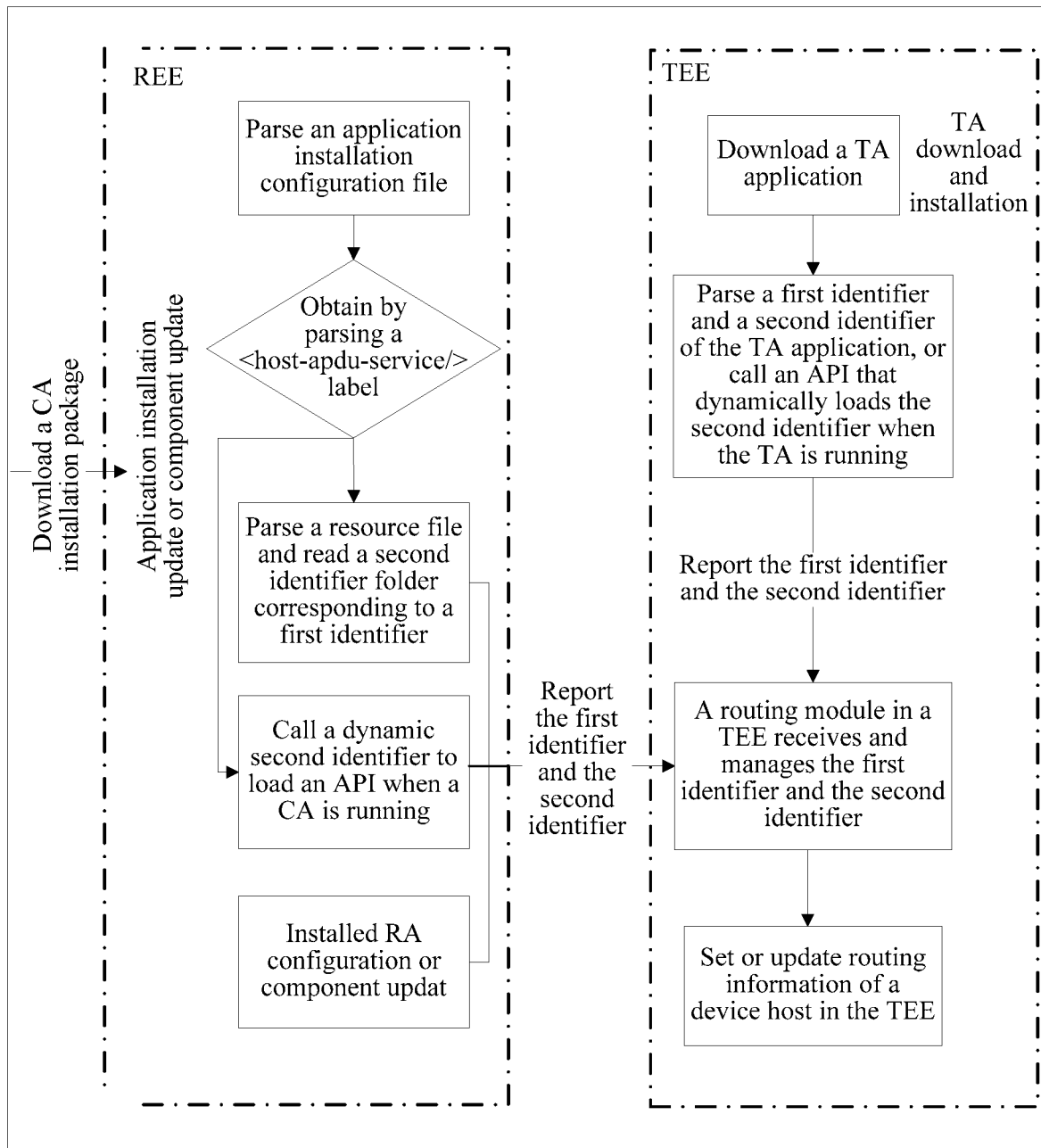
FIG. 6 is a schematic diagram of a saving process of routing information according to an embodiment of the present invention.

In this embodiment of the present invention, a process of registering the routing information is performed in advance. Refer to FIG. 6. An HCE application in the REE may specify a second identifier list corresponding to the HCE application by using a static resource file or may specify a second identifier list corresponding to the HCE application by using a dynamic registration application programming interface (Application Programming Interface, API). Whether a static method or a dynamic method is used, a mapping relationship between the first identifier and the second identifier needs to be sent to the route management module in the TEE by using a TEE client application programming interface (TEE Client API) or a shared memory. An HCE application in the TEE may also declare the second identifier corresponding to the HCE application by using the foregoing static or dynamic method. A difference lies in that in this case, the mapping relationship between the first identifier and the second identifier is sent to the route management module in the TEE not by using the TEE Client API or the shared memory but by using a communications mechanism, that is, a session (session), between TAs. The route management module obtains, by parsing from the first identifier, the terminal environment in which the HCE application is installed. The first identifier of the HCE application, at least one second identifier corresponding to the first identifier, and the terminal environment in which the HCE application is installed are saved in the route management module as at least one routing entry. In FIG. 6, for the REE, after the user downloads a CA installation package, the terminal parses an application installation configuration file, obtains a <host-apdu-service/> label by parsing, knows that the HCE application is a CA, further parses the resource file, reads a second identifier in the resource file, and sends the read first identifier and at least one second identifier to the route management module in the TEE.

Further, in this embodiment of the present invention, for an HCE application (which is a CA) in the REE, the mapping relationship between the first identifier and the second identifier is sent to the route management module in the TEE by calling a dynamic second identifier to load an API when the CA is running. In this embodiment of the present invention, when a CA application updates or components update, for example, when a software application version is upgraded or a new card application is added to the HCE application, that is, when an AID is newly added, updated information also needs to be sent to the TEE, to implement accurate routing. In FIG. 6, for the TEE, after the user downloads an HCE application (which is a TA) installation package, the terminal parses a first identifier and a second identifier of the TA application, or calls an API that dynamically loads the second identifier when the TA is running, and sends the mapping relationship between the first identifier and the second identifier to the route management module in the TEE. The route management module in the TEE receives and manages the first identifier and the second identifier and saves or updates the routing information of the HCE application in the TEE.

Figure 7:
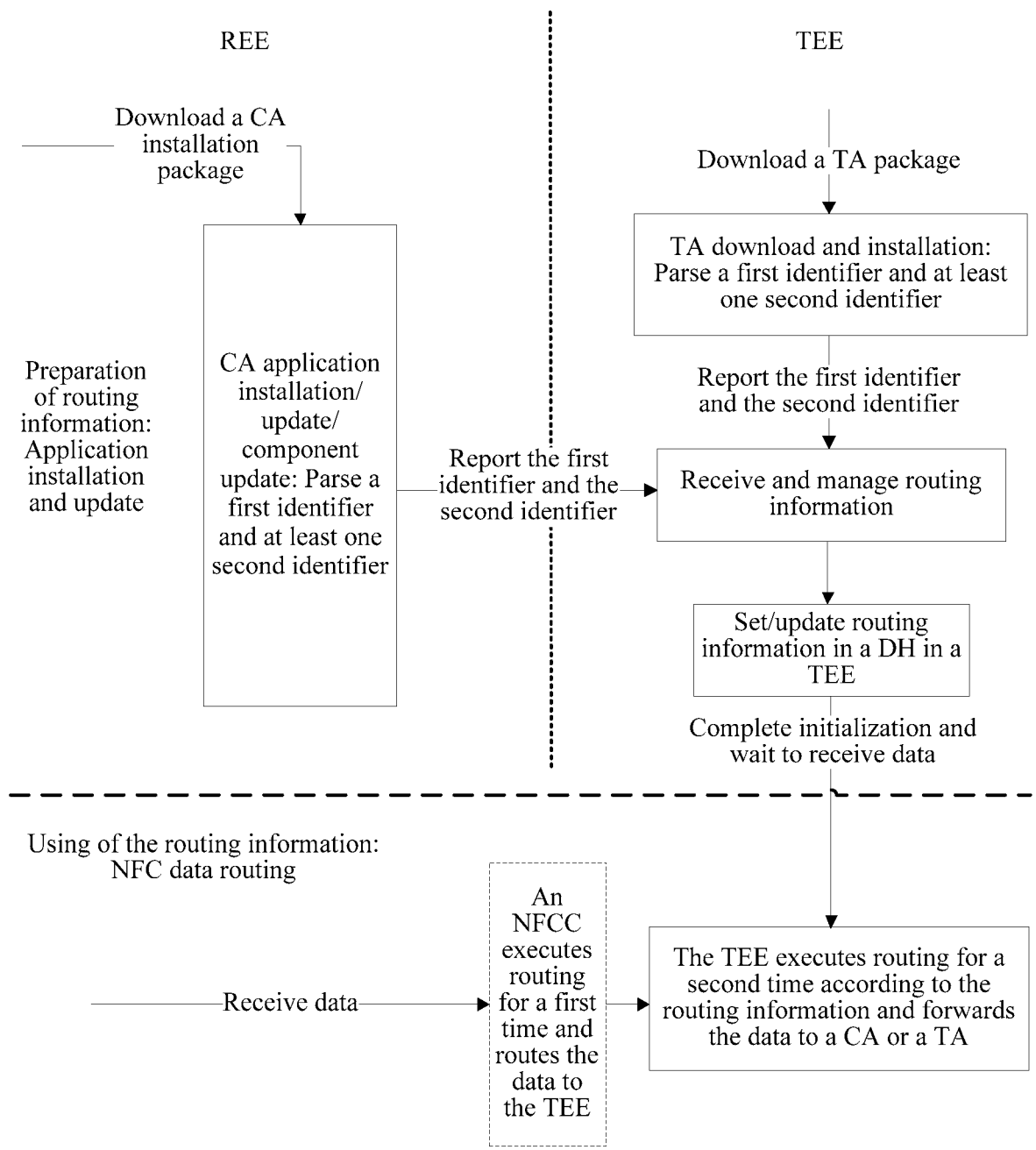
FIG. 7 is a schematic diagram of a process of routing external data according to routing information saved by an application according to an embodiment of the present invention.

In this embodiment of the present invention, after the routing information of the HCE application is pre-saved, data receiving may wait. After the data is received, the NFCC executes routing for the first time, and routes the data to the route management module in the TEE, and the route management module performs routing for a second time according to the pre-saved routing information, and forwards the data to a CA or a TA, as shown in FIG. 7.

Routing for a second time refers to a process of receiving, by the route management module, data and forwarding the data to a CA or a TA.

In this embodiment of the present invention, the routing table is set in the route management module in the TEE according to the saved routing information. The routing table includes: first identifiers and second identifiers of the TA and the CA, and terminal environments in which the TA and the CA are installed. The route management module routes data to a corresponding HCE application according to the routing table.

FIG. 8 is a routing table that is set in this embodiment of the present invention. As shown in FIG. 8, a routing entry is separately set for each second identifier and a first identifier corresponding to the second identifier. For example, a second identifier 1 and a first identifier 1 of the CA corresponds to a router 1, and a second identifier 2 and a first identifier 2 of the TA corresponds to a router 2.

It should be noted that in this embodiment of the present invention, by using the method shown in FIG. 6, registration of the CA, the TA, and the first identifiers and the second identifiers corresponding to the CA and TA with the TEE is completed, and preparation of the routing information is completed. However, in a specific implementation process, because the TA is introduced, following modifications need to be made to a current HCE mechanism:

Amendments to the configuration file: A application type label, that is, a first identifier label, such as a <TEE-apdu-service/> label, for identifying an HCE application in the TEE needs to be added, so as to indicate existence of an HCE application running in the TEE in the configuration file.

Amendments to the resource file: an application type label, that is, a first label, such as a <TEE-apdu-service/> label, for identifying an HCE application in the TEE needs to be associated with multiple second identifier labels, such as a <AID-filter> label, so as to notify a service framework of a message flow between the HCE application and a card reader that can be processed by the TA.

In this embodiment of the present invention, the CA is installed in the REE, the TA is installed in the TEE, and after the HCE application is installed in a corresponding environment, when the terminal interacts with a contactless card reading device, the HCE in the corresponding environment processes data.

In this embodiment of the present invention, the terminal may send the external data to the HCE application corresponding to the external data in the TEE, or the route management module in the TEE may execute routing for the second time, by using the method shown in FIG. 9:

S1051: The route management module in the TEE obtains a second identifier in the external data, where the second identifier is used to identify a message flow between a card reading device and an HCE application on the terminal. The route management module executes an operation of obtaining the second identifier only when receiving a SELECT AID instruction. When another APDU instruction is received, if a SELECT AID is not received before, the operation is considered to be incorrect. If a SELECT AID instruction is received before, the instruction is forwarded to an HCE application corresponding to the SELECT AID instruction.

S1052: The route management module in the TEE determines, according to the routing information that is of the HCE application and that is registered with the TEE, an external-data first identifier corresponding to the second identifier in the external data and a terminal environment in which an HCE application corresponding to the external-data first identifier is installed. After obtaining the second identifier from the external data, the route management module compares the obtained second identifier with AIDs in the routing table of the route management module in the TEE in sequence until a same AID is found. In this case, a first identifier of a routing entry including the same AID is used as the external-data first identifier, and a terminal environment in which an HCE application corresponding to the AID is installed is found.

S1053: The route management module in the TEE sends, according to the determined terminal environment, the external data to the HCE application corresponding to the external-data first identifier.

In this embodiment of the present invention, the external-data first identifier corresponding to the second identifier and the terminal environment in which the HCE application is installed may be determined according to the routing information by obtaining the second identifier in the external data. After the terminal environment in which the HCE application is installed is determined, the obtained data may be routed to an HCE application in a corresponding environment, so that data routing supporting the HCE application with different security levels is completed.

It should be noted that the routing information in this embodiment of the present invention may further only include the first identifier and the second identifier. The external-data first identifier corresponding to the second identifier is determined by obtaining the second identifier in the external data. Whether the HCE application is a TA or a CA may be determined by parsing the external-data first identifier. Therefore, an installation environment of the HCE application can be known. If the HCE application is a TA, the installation environment is the TEE. If the HCE application is a CA, the installation environment is the REE.

In this embodiment of the present invention, according to the determined terminal environment in which the HCE application is installed, the data may be sent to an HCE application corresponding to the external-data first identifier by using the following manner:

A: If the determined terminal environment in which the HCE application is installed is the TEE, send the data to an HCE application corresponding to the external-data first identifier in the TEE by using an established session.

The route management module in the TEE finds, according to the second identifier in the external data, in the routing table the corresponding external-data first identifier and the terminal environment in which the HCE application is installed. Then, the route management module, that is, the Route-TA in FIG. 1A and FIG. 1B, establishes a session (session) to a target TA by using an internal client API (Internal Client API) defined in TEE internal core API (TEE Internal Core API) standards, and forwards data to the TA, as shown in FIG. 10. Because when the TA is installed, a first identifier and at least one second identifier of the TA, and a terminal environment in which the TA is installed are registered with the Route-TA (that is, the route management module) in the TEE, the Route-TA may actively send the obtained external data to the TA. Therefore, after a session is established, if a received data frame does not include a second identifier selection command, the external data may be forwarded to the corresponding TA by using the currently established session all the time.

B: If the determined terminal environment in which the HCE application is installed is the REE, send the external data to an HCE application corresponding to the external-data first identifier in the REE by using a service program or a shared memory in the TEE.

Figure 11A:
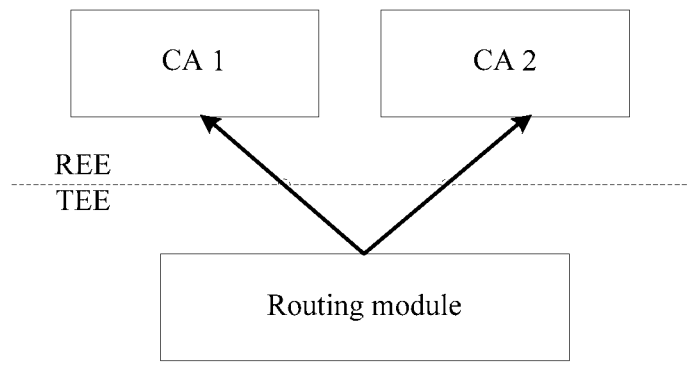
FIG. 11A to FIG. 11B are schematic diagrams of a process of forwarding external data to a CA according to an embodiment of the present invention.
Figure 11B:
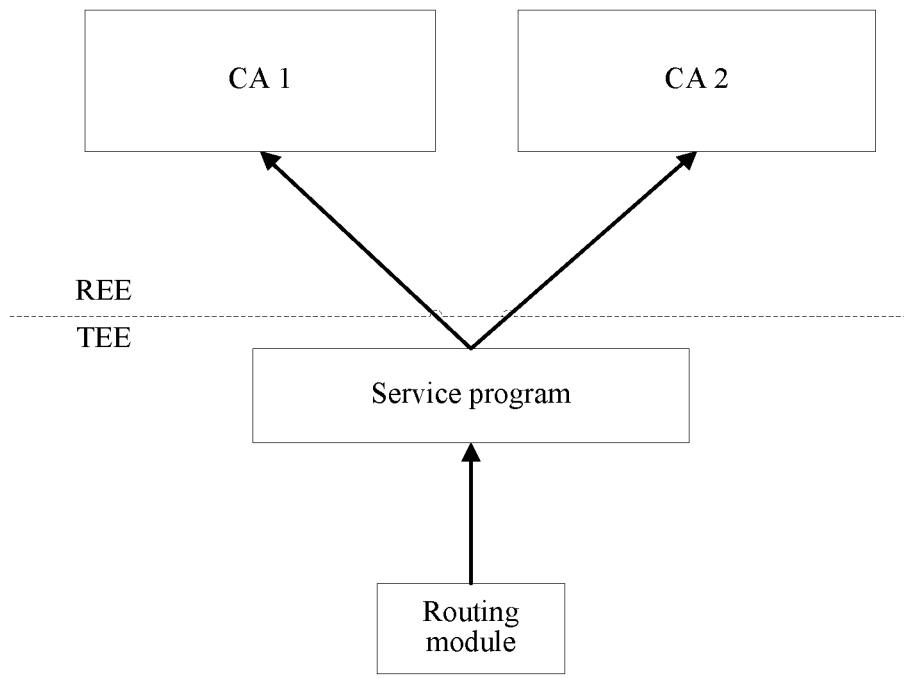

Specifically, when a CA starts, a session from the CA to a TA is established by using a service program (REE NFC Service), referred to as a first identifier UUID of an RNS-TA herein for short. The session is in a pending (pending) state. After the RNS-TA receives data from the Route-TA, the route management module marks which CA should process the data. Therefore, the RNS-TA may return the data to the CA by using the established session. Therefore, in this embodiment of the present invention, the route management module in the TEE searches, according to the second identifier in the external data, for the corresponding external-data first identifier and the terminal environment in which the HCE application is installed. Then, the route management module, that is, the Route-TA in FIG. 1A and FIG. 1B, forwards the data to a service program in the TEE, so as to forward the external data to a corresponding CA, as shown in FIG. 11A. In this embodiment of the present invention, if it is determined that the installation environment of the HCE application is installed is the REE, the route management module may also directly send the external data to the CA by using a shared memory, as shown in FIG. 11B.

In this embodiment of the present invention, when the external data is received again, and the external data includes a second identifier selection command (that is, the SELECT AID command), the NFCC forwards a data frame to the TEE, and the route management module in the TEE executes routing in the TEE. The route management module determines whether the external-data second identifier is processed by an HCE application that has established a session. This is marked as processing by an HCE application 1. If the external-data second identifier is processed by the HCE application 1, the route management module directly sends the external data to the HCE application 1 by using the current session. If the external-data second identifier is processed by another HCE application different from the current HCE application, the another HCE application being marked as an HCE application 2, the route management module can select to keep the current session or close the current session. However, a second session is necessarily established according to a first identifier of the HCE application 2, and the second identifier selection command and subsequent external data are sent to the HCE application 2 by using the second session.

A data routing process involved in the foregoing is described in detail below with reference to actual application in this embodiment of the present invention.

In this embodiment of the present invention, an example in which a contactless POS machine communicates with the terminal is used for description. A terminal supporting the TEE is used as a card emulation device. When a contactless POS machine sends transaction data to the terminal by using a near field communication NFC payment environment, the terminal obtains the transaction data by using an NFCC and transmits the transaction data to the route management module in the TEE by using an NFCC in the REE or an NFCC in the TEE. The route management module in the TEE searches, according to an AID, that is, a second identifier, in the transaction data, for the first identifier corresponding to the second identifier. The terminal may know, according to the first identifier, which TA or CA should be used to process the transaction data, so as to establish a session and send, by using the established session, the transaction data to a TA or a CA corresponding to the AID.

It should be noted that in this embodiment of the present invention, a CA is installed in the REE, and a TA is installed in the TEE. After the HCE application is installed in a corresponding environment, the HCE application interacts with a card reading device at the terminal. When an HCE application in a corresponding environment performs data processing, a data routing processing process involved in the foregoing embodiment may be used, that is, this embodiment of the present invention may further provide a data routing method. Refer to description of the foregoing embodiment for a specific implementation process. The process is not described again herein in this embodiment of the present invention.

In the method for implementing host card emulation provided in this embodiment of the present invention, a terminal can distinguish, by using two different application type labels in a resource file, that a terminal environment in which an HCE application is installed is a TEE or an REE. Therefore, when receiving an HCE application installation package, the terminal can determine, by using the application type labels in the resource file, the terminal environment in which the HCE application is installed and distinguish that the HCE application is a TA or a CA, so as to install the TA in the TEE and install the CA in the REE, so that an HCE application with two different security levels is supported. In this way, a developer can select to implement an HCE function in the TEE or select to implement an HCE function in the REE according to needs, to satisfy requirements of different application functions.

Figure 12A:
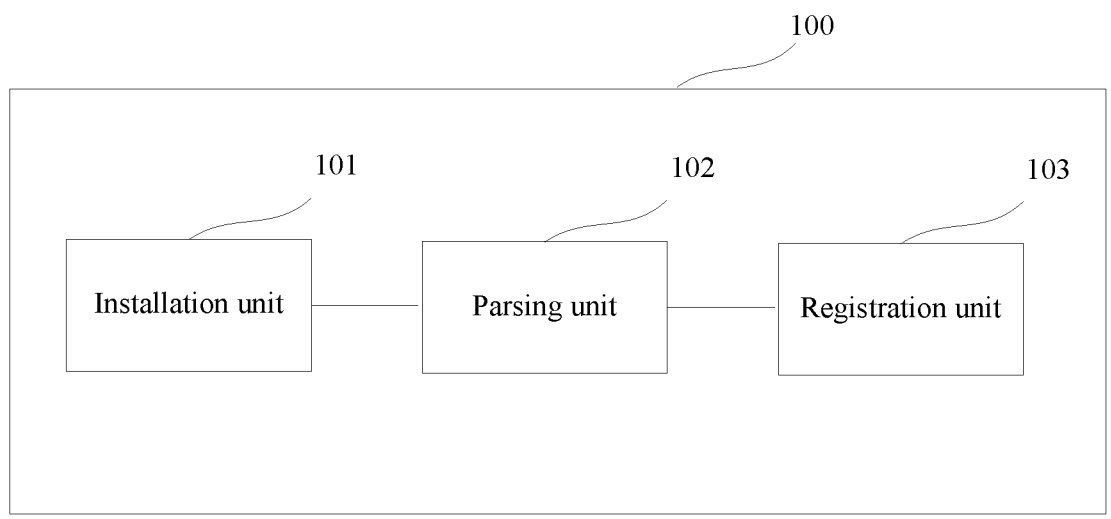
FIG. 12A to FIG. 12B are schematic diagrams of a composition of a terminal for implementing host card emulation according to an embodiment of the present invention.
Figure 12B:
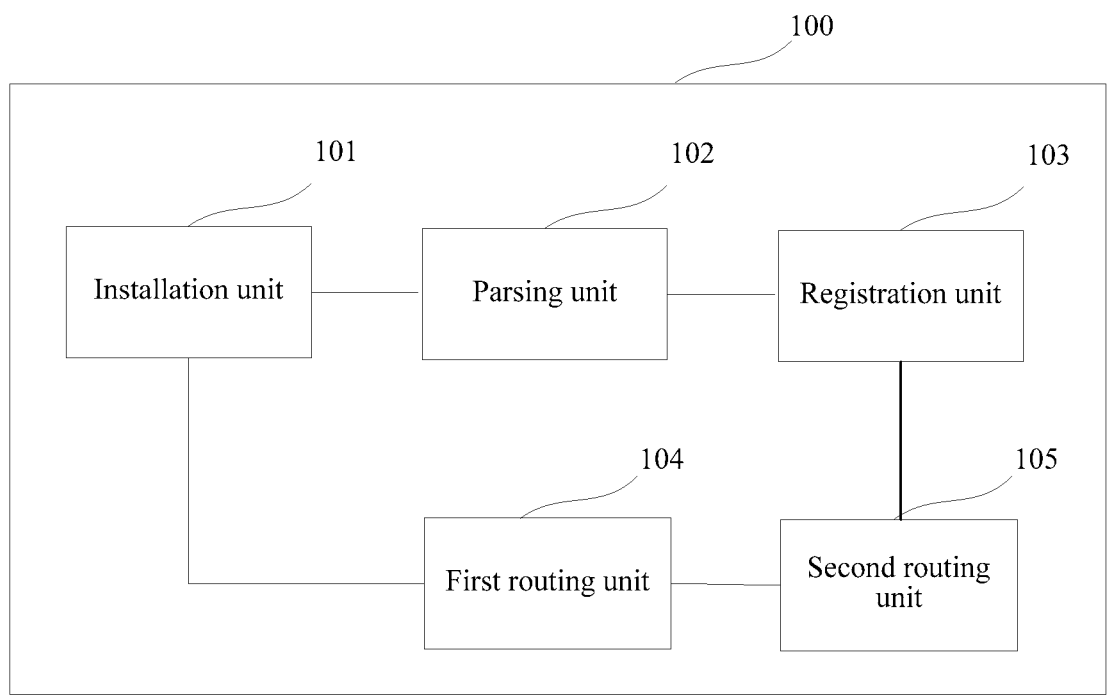

Based on the method for implementing host card emulation provided in the foregoing embodiment, an embodiment of the present invention further provides a terminal 100 for implementing host card emulation HCE. The terminal 100 for implementing host card emulation HCE includes an installation unit 101, a parsing unit 102, and a registration unit 103. As shown in FIG. 12A, in this embodiment of the present invention:

The installation unit 101 is configured to install, according to a type of an HCE application, the HCE application in a terminal environment corresponding to the type of the HCE application.

In this embodiment of the present invention, the terminal environment includes a trusted execution environment TEE and a rich execution environment REE.

The parsing unit 102 is configured to parse a first identifier of the HCE application installed by the installation unit 101 and at least one second identifier included in the HCE application.

In this embodiment of the present invention, the first identifier is used to uniquely identify the HCE application in the terminal, and the second identifier is used to identify a message flow between a card reading device and the HCE application.

The registration unit 103 is configured to register routing information of the HCE application with the TEE, where the routing information includes the first identifier and the at least one second identifier that are parsed by the parsing unit 102, and the terminal environment in which the HCE application is installed.

According to the terminal 100 for implementing host card emulation provided in this embodiment of the present invention, the HCE application is distinguished as a TA or a CA by using different application type labels, so as to install the TA in a TEE and install the CA in an REE, implementing HCE applications based on two different security levels, that is, the TEE and the REE.

In a first implementation manner, the terminal 100 for implementing host card emulation provided in this embodiment of the present invention further includes a first routing unit 104 and a second routing unit 105.

The first routing unit 104 is configured to send obtained external data to the second routing unit in the TEE.

The second routing unit 105 is configured to send the external data to an HCE application that corresponds to the external data and that is installed by the installation unit 101.

Specifically, the first routing unit 104 is specifically configured to send the obtained external data to the second routing unit 105 in the TEE in the following manner:

obtaining external data by using a near field communication controller NFCC in the TEE or an NFCC in the REE; and sending, by the NFCC in the TEE or the NFCC in the REE, the external data that a route target is a device host to the second routing unit 105 in the TEE.

Further, the second routing unit 105 is specifically configured to send the external data to the HCE application corresponding to the external data in the following manner:

obtaining a second identifier in the external data;

determining, according to the routing information registered with the TEE, an external-data first identifier corresponding to the second identifier in the external data and a terminal environment in which an HCE application corresponding to the external-data first identifier is installed; and sending, according to the determined terminal environment, the external data to the HCE application corresponding to the external-data first identifier.

Specifically, the second routing unit 105 is specifically configured to send, according to the determined terminal environment, the external data to the HCE application corresponding to the external-data first identifier in the following manner:

if the determined terminal environment is the TEE, sending the external data to an HCE application corresponding to the external-data first identifier in the TEE by using an established session; and if the determined terminal environment is the REE, sending the external data to an HCE application corresponding to the external-data first identifier in the REE by using a service program or a shared memory in the TEE.

The terminal 100 for implementing host card emulation provided in this embodiment of the present invention is used to implement functions of the method for implementing host card emulation involved in the foregoing embodiment of the present invention. Refer to description of the foregoing embodiment for a specific implementation process. The process is not described again herein in this embodiment of the present invention.

According to the terminal 100 for implementing host card emulation provided in this embodiment of the present invention, whether an installation environment of an HCE application is a TEE or an REE may be distinguished by the terminal by using two different application type labels. Therefore, when receiving an HCE application installation package, the terminal may determine, by using the application type labels, a terminal environment in which the HCE application is installed, and distinguish that the HCE application is a TA or a CA, so as to install the TA in the TEE and install the CA in the REE, so that an HCE application with two different security levels, the TEE and the REE, is supported. In this way, a developer can select to implement an HCE function in the TEE or select to implement an HCE function in the REE according to needs, to satisfy requirements of different application functions.

Figure 13:
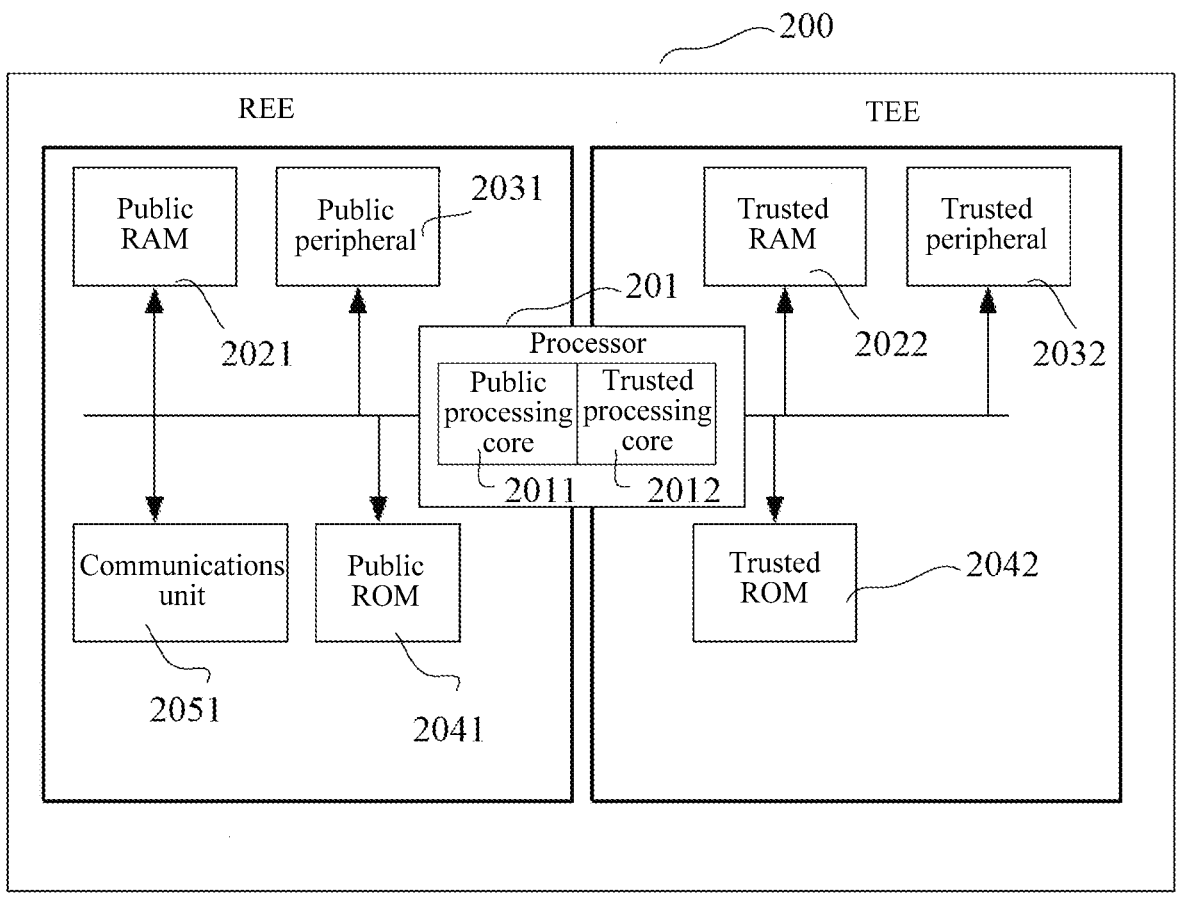
FIG. 13 is a schematic diagram of another composition of a terminal for implementing host card emulation according to an embodiment of the present invention.

Based on the method for implementing host card emulation provided in the foregoing embodiment, an embodiment of the present invention further provides a terminal 200 for implementing host card emulation. As shown in FIG. 13, the terminal 200 for implementing host card emulation includes a processor 201. The terminal 200 for implementing host card emulation includes two running environments, an REE and a TEE. A processor is included in either of the two running environments. That is, the processor 201 of the terminal 200 for implementing host card emulation includes a public processing core 2011 and a trusted processing core 2012. The public processing core 2011 is a processor of the REE, and the trusted processing core 2012 is a processor of the TEE. It should be noted that in the present invention, the public processing core 2011 and the trusted processing core 2012 may be different cores of a same entity CPU or may be different CPU times of a same entity CPU.

Further, the terminal 200 for implementing host card emulation provided in this embodiment of the present invention further includes a storage. The storage includes a public random-access memory (Random-Access Memory, RAM) 2021 and a public read-only memory (read-only Memory, ROM) 2041 that are running in the REE, and a trusted RAM 2022 and a trusted ROM 2042 that are running in the TEE.

The public RAM 2021, the public ROM 2041, the trusted RAM 2022, and the trusted ROM 2042 in this embodiment of the present invention may be used to store instructions and data. An instruction storage area may store an operating system, instructions required by at least one function, and the like. The instructions may enable the processor 201 to execute the method for implementing host card emulation involved in the foregoing embodiment of the present invention.

The terminal 200 for implementing host card emulation in terminals in this embodiment of the present invention further includes a peripheral. The peripheral includes a public peripheral 2031 in the REE and a trusted peripheral 2032 in the TEE. When an NFCC is located in the REE, the NFCC is a public peripheral. When an NFCC is located in the TEE, the NFCC is a trusted peripheral.

Further, the terminal 200 for implementing host card emulation in terminals in this embodiment of the present invention further includes a communications unit 2051 located in the REE.

The processor 201 in this embodiment of the present invention is a control center of the terminal 200 for implementing host card emulation, connects parts of an entire mobile phone by using various interfaces and lines, and executes various functions and data processing of the terminal 200 for implementing host card emulation by using the trusted peripheral 2032, the public peripheral 2031, and the communications unit 2051 by running or executing instructions stored in the public RAM 2021, the public ROM 2041, the trusted RAM 2022, and the trusted ROM 2042 and calling data stored in the public RAM 2021, the public ROM 2041, the trusted RAM 2022, and the trusted ROM 2042, so as to perform integral control on the terminal 200 for implementing host card emulation. Optionally, the processor 201 may include one or more processing units. Preferably, the processor 201 may integrate an application processor and a modem processor. The application processor mainly processes an operating system, a user interface, an application program, and the like. The modem processor mainly processes radio communication. It may be understood that the modem processor may also not be integrated into the processor 201. In some embodiments, a processor and a storage may be implemented on a single chip. In some embodiments, a processor and a storage may be separately implemented on independent chips.

The processor 201 included in the terminal 200 for implementing host card emulation provided in this embodiment of the present invention is configured to call instructions and data stored in the public RAM 2021, the public ROM 2041, the trusted RAM 2022, and the trusted ROM 2042, and implement the following functions by using the trusted peripheral 2032, the public peripheral 2031, and the communications unit 2051:

installing, according to a type of an HCE application, the HCE application in a terminal environment corresponding to the type of the HCE application, where the terminal environment includes the TEE and the REE; parsing a first identifier of the HCE application and at least one second identifier included in the HCE application, where the first identifier is used to uniquely identify the HCE application in the terminal, and the second identifier is used to identify a message flow between a card reading device and the HCE application; and registering routing information of the HCE application with the TEE, where the routing information includes the first identifier, the at least one second identifier, and the terminal environment in which the HCE application is installed.

Further, the processor 201 is further configured to:

send obtained external data to a route management module in the TEE; and control the route management module to send the external data to an HCE application corresponding to the external data.

Specifically, the processor 201 is specifically configured to send the obtained external data to the route management module in the TEE in the following manner:

obtaining external data by using an NFCC in the TEE or an NFCC in the REE; and sending, by the NFCC in the TEE or the NFCC in the REE, the external data that a route target is a device host to the route management module in the TEE.

Specifically, the processor 201 is specifically configured to control the route management module to send the external data to the HCE application corresponding to the external data in the following manner:

controlling the route management module to obtain a second identifier in the external data by using the communications unit and the peripheral; determining, according to the routing information registered with the TEE, an external-data first identifier corresponding to the second identifier in the external data and a terminal environment in which an HCE application corresponding to the external-data first identifier is installed; and controlling the route management module to send, according to the determined terminal environment, the external data to the HCE application corresponding to the external-data first identifier.

Specifically, the processor 201 is specifically configured to control the route management module to send, according to the determined terminal environment, the external data to the HCE application corresponding to the external-data first identifier in the following manner:

if the determined terminal environment is the TEE, sending the external data to an HCE application corresponding to the external-data first identifier in the TEE by using an established session; and if the determined terminal environment is the REE, sending the external data to an HCE application corresponding to the external-data first identifier in the REE by using a service program or a shared memory in the TEE.

The terminal 200 for implementing host card emulation provided in this embodiment of the present invention has functions for implementing any method for implementing host card emulation involved in the foregoing embodiments of the present invention. Refer to description of the foregoing embodiments for specific implemented functions. The functions are not described again herein in this embodiment of the present invention.

According to the terminal 200 for implementing host card emulation provided in this embodiment of the present invention, whether an installation environment of an HCE application is a TEE or an REE may be distinguished by the terminal by using two different application type labels. Therefore, when receiving an HCE application installation package, the terminal may determine, by using the application type labels, a terminal environment in which the HCE application is installed, and distinguish that the HCE application is a TA or a CA, so as to install the TA in the TEE and install the CA in the REE, so that an HCE application with two different security levels, the TEE and the REE, is supported. In this way, a developer can select to implement an HCE function in the TEE or select to implement an HCE function in the REE according to needs, to satisfy requirements of different application functions.

Figure 14:
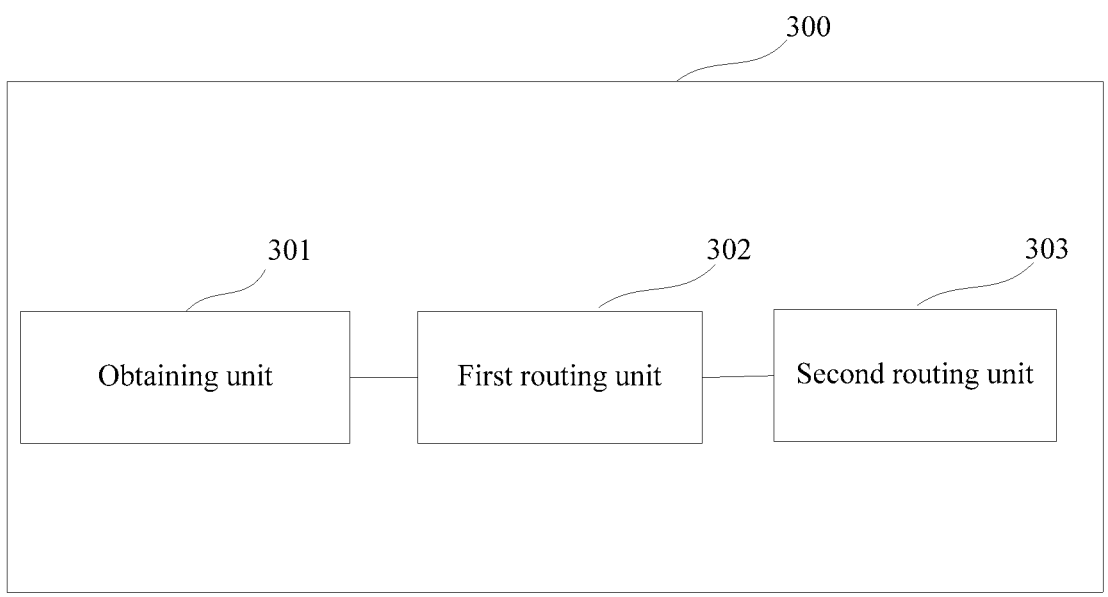
FIG. 14 is a schematic diagram of a composition of a data routing apparatus according to an embodiment of the present invention.

Based on the data routing process in the method for implementing host card emulation provided in the foregoing embodiment, an embodiment of the present invention further provides a data routing apparatus 300. As shown in FIG. 14, the data routing apparatus 300 includes an obtaining unit 301, a first routing unit 302, and a second routing unit 303.

The obtaining unit 301 is configured to obtain external data.

The first routing unit 302 is configured to send the external data obtained by the obtaining unit 301 to a TEE.

The second routing unit 303 is configured to send the external data to an HCE application corresponding to the external data.

In a first implementation manner, the first routing unit 302 is specifically configured to send the obtained external data to the TEE in the following manner:

obtaining the data by using an NFCC driver in the TEE or an NFCC driver in an REE, and sending the external data that a route target is a device host to the second routing unit 303 in the TEE.

In a second implementation manner, the second routing unit 303 is specifically configured to send the external data to the HCE application corresponding to the external data in the following manner:

obtaining a second identifier in the external data, where the second identifier is used to identify a message flow between a card reading device and the HCE application;

determining, according to routing information that is of the HCE application and that is registered with the TEE, an external-data first identifier corresponding to the second identifier in the external data and a terminal environment in which an HCE application corresponding to the external-data first identifier is installed, where the first identifier is used to uniquely identify an HCE application in the terminal; and sending, according to the determined terminal environment, the external data to the HCE application corresponding to the external-data first identifier.

In a third implementation manner, the second routing unit 303 is specifically configured to send, according to the determined terminal environment, the external data to the HCE application corresponding to the external-data first identifier in the following manner:

if the determined terminal environment is the TEE, sending the external data to an HCE application corresponding to the external-data first identifier in the TEE by using an established session; and if the determined terminal environment is the REE, sending the external data to an HCE application corresponding to the external-data first identifier in the REE by using a service program or a shared memory in the TEE.

The data routing apparatus 300 provided in this embodiment of the present invention is configured to implement the data routing process in the method for implementing host card emulation involved in the foregoing embodiment of the present invention. Refer to description of the foregoing embodiment for a specific implementation process. The process is not described again herein in this embodiment of the present invention.

The data routing apparatus 300 provided in this embodiment of the present invention can determine, by obtaining a second identifier in external data, an external-data first identifier corresponding to the second identifier, and can determine, by using the external-data first identifier, whether an HCE application is a TA or a CA, so as to know an installation environment of the HCE application. If the HCE application is a TA, the installation environment is a TEE. If the HCE application is a CA, the installation environment is an REE. After the installation environment of the HCE application is determined, the obtained data may be routed to an HCE application in a corresponding environment, completing data routing supporting the HCE application with different security levels.

A person of ordinary skill in the art may understand that all or a part of the steps in each of the foregoing method of the embodiments may be implemented by a program instructing a processor. The foregoing program may be stored in a computer readable storage medium. The storage medium may be a non-transitory (non-transitory) medium, such as a random-access memory, a read-only memory, a flash memory, a hard disk, a solid state drive, a magnetic tape (magnetic tape), a floppy disk (floppy disk), an optical disc (optical disc), or any combination thereof.

The present invention is described with reference to flowcharts and block diagrams of the method and the device in the embodiments of the present invention. It should be understood that computer program instructions may be used to implement each process and each block in the flowcharts and the block diagrams and a combination of a process and a block in the flowcharts and the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts or in one or more blocks in the block diagrams.

The foregoing descriptions are merely example implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method for implementing host card emulation (HCE), comprising:
installing, by a terminal according to a type of an HCE application, the HCE application in a terminal environment corresponding to the type of the HCE application, wherein the terminal environment comprises a trusted execution environment (TEE) and a rich execution environment (REE);
parsing, by the terminal, a first identifier of the HCE application and a second identifier comprised in the HCE application, wherein the first identifier identifies the HCE application in the terminal, and the second identifier identifies a message flow between a card reading device and the HCE application;
registering, by the terminal, routing information of the HCE application with the TEE, wherein the routing information comprises the first identifier, the second identifier, and the terminal environment in which the HCE application is installed;
sending, by the terminal, external data to the TEE; and
sending, by the TEE, the external data to the HCE application corresponding to the external data, wherein sending the external data to the HCE application comprises obtaining, by the TEE, a second identifier in the external data.

2. The method according to claim 1, wherein the external data is obtained by a near field communication controller (NFCC) in the TEE or in the REE.

3. The method according to claim 1, wherein the sending, by the TEE, the external data to the HCE application corresponding to the external data comprises:
determining, by the TEE, according to the routing information registered with the TEE, an external-data first identifier corresponding to the second identifier in the external data and the terminal environment in which the HCE application corresponding to the external-data first identifier is installed; and
sending, by the TEE and according to the determined terminal environment, the external data to the HCE application corresponding to the external-data first identifier.

4. The method according to claim 3, wherein the sending, by the TEE and according to the determined terminal environment, the external data to the HCE application corresponding to the external-data first identifier comprises:
if the determined terminal environment is the TEE, sending the external data to the HCE application corresponding to the external-data first identifier in the TEE by using an established session; and
if the determined terminal environment is the REE, sending the external data to the HCE application corresponding to the external-data first identifier in the REE by using a service program or a shared memory in the TEE.

5. A terminal, comprising:
a non-transitory memory storage comprising instructions; and
one or more hardware processors in communication with the memory storage, wherein the one or more hardware processors execute the instructions to:
install, according to a type of a host card emulation (HCE) application, the HCE application in a terminal environment corresponding to the type of the HCE application, wherein the terminal environment comprises a trusted execution environment (TEE) and a rich execution environment (REE);
parse a first identifier of the HCE application and a second identifier comprised in the HCE application, wherein the first identifier identifies the HCE application in the terminal, and the second identifier identifies a message flow between a card reading device and the HCE application;
register routing information of the HCE application with the TEE, wherein the routing information comprises the first identifier and the second identifier, and the terminal environment in which the HCE application is installed;
send external data to the TEE; and
send the external data to the HCE application that corresponds to the external data, wherein sending the external data to the HCE application comprises obtaining a second identifier in the external data.

6. The terminal according to claim 5, wherein the external data is obtained by a near field communication controller (NFCC) in the TEE or in the REE.

7. The terminal according to claim 5, wherein the one or more hardware processors execute the instructions to:
determining, according to the routing information registered with the TEE, an external-data first identifier corresponding to the second identifier in the external data and the terminal environment in which the HCE application corresponding to the external-data first identifier is installed; and
sending, according to the determined terminal environment, the external data to the HCE application corresponding to the external-data first identifier.

8. The terminal according to claim 7, wherein the one or more hardware processors execute the instructions to:
if the determined terminal environment is the TEE, sending the external data to the HCE application corresponding to the external-data first identifier in the TEE by using an established session; and
if the determined terminal environment is the REE, sending the external data to the HCE application corresponding to the external-data first identifier in the REE by using a service program or a shared memory in the TEE.

9. A terminal, comprising: a storage, a peripheral, a communications interface, and a processor, wherein
the storage comprises a public random-access memory (RAM) and a public read-only memory (ROM) that are running in a rich execution environment (REE);
the storage further comprises a trusted RAM and a trusted ROM that are running in a trusted execution environment (TEE);
the storage is configured to store instructions and data;
the peripheral comprises a public peripheral in the REE and a trusted peripheral in the TEE;
the communications interface is located in the REE; and
the processor executes the instructions stored in the storage to implement the following functions by using the trusted peripheral, the public peripheral, and the communications interface:
installing, according to a type of an HCE application, the HCE application in a terminal environment corresponding to the type of the HCE application, wherein the terminal environment comprises the TEE and the REE;
parsing a first identifier of the HCE application and a second identifier comprised in the HCE application, wherein the first identifier identifies the HCE application in the terminal, and the second identifier identifies a message flow between a card reading device and the HCE application;

registering routing information of the HCE application with the TEE, wherein the routing information comprises the first identifier, the second identifier, and the terminal environment in which the HCE application is installed;

sending external data to the TEE; and sending the external data to the HCE application corresponding to the external data, wherein sending the external data to the HCE application comprises obtaining a second identifier in the external data by using the communications interface and the peripheral.

10. The terminal according to claim 9, wherein the external data is obtained by a near field communication controller (NFCC) in the TEE or in the REE.

11. The terminal according to claim 9, wherein the processor executes the instructions to implement functions of:

determining, according to the routing information registered with the TEE, an external-data first identifier corresponding to the second identifier in the external data and the terminal environment in which the HCE application corresponding to the external-data first identifier is installed; and sending, according to the determined terminal environment, the external data to the HCE application corresponding to the external-data first identifier.

12. The terminal according to claim 11, wherein the processor executes the instructions to implement functions of:

if the determined terminal environment is the TEE, sending the external data to the HCE application corresponding to the external-data first identifier in the TEE by using an established session; and if the determined terminal environment is the REE, sending the external data to the HCE application corresponding to the external-data first identifier in the REE by using a service program or a shared memory in the TEE.

13. The method according to claim 2, wherein the sending, by the TEE, the external data to the HCE application corresponding to the external data specifically comprises:

obtaining, by the TEE, a second identifier in the external data;

determining, by the TEE, according to the routing information registered with the TEE, an external-data first identifier corresponding to the second identifier in the external data and the terminal environment in which the HCE application corresponding to the external-data first identifier is installed; and sending, by the TEE and according to the determined terminal environment, the external data to the HCE application corresponding to the external-data first identifier.

14. The method according to claim 13, wherein the sending, by the TEE and according to the determined terminal environment, the external data to the HCE application corresponding to the external-data first identifier comprises:

if the determined terminal environment is the TEE, sending the external data to the HCE application corresponding to the external-data first identifier in the TEE by using an established session; and if the determined terminal environment is the REE, sending the external data to the HCE application corresponding to the external-data first identifier in the REE by using a service program or a shared memory in the TEE.

15. The terminal according to claim 6, wherein the one or more hardware processors execute the instructions to:

obtaining a second identifier in the external data;

determining, according to the routing information registered with the TEE, an external-data first identifier corresponding to the second identifier in the external data and the terminal environment in which the HCE application corresponding to the external-data first identifier is installed; and sending, according to the determined terminal environment, the external data to the HCE application corresponding to the external-data first identifier.

16. The terminal according to claim 15, wherein the one or more hardware processors execute the instructions to:

if the determined terminal environment is the TEE, sending the external data to the HCE application corresponding to the external-data first identifier in the TEE by using an established session; and if the determined terminal environment is the REE, sending the external data to the HCE application corresponding to the external-data first identifier in the REE by using a service program or a shared memory in the TEE.

17. The terminal according to claim 10, wherein the processor executes the instructions to implement functions of:

obtaining a second identifier in the external data by using the communications interface and the peripheral;

determining, according to the routing information registered with the TEE, an external-data first identifier corresponding to the second identifier in the external data and the terminal environment in which the HCE application corresponding to the external-data first identifier is installed; and sending, according to the determined terminal environment, the external data to the HCE application corresponding to the external-data first identifier.

* * * * *